United States Patent
Jia

(10) Patent No.: US 9,862,555 B2
(45) Date of Patent: Jan. 9, 2018

(54) SYSTEM FOR PROVIDING AUTOMATIC FEEDBACK AND ADJUSTING TRANSMITTAL PULLING FORCE FOR TRANSPORTING GLASS FRAGMENT

(71) Applicant: SHENZHEN CHINA STAR OPTOELECTRONICS TECHNOLOGY CO., LTD., Shenzhen, Guangdong (CN)

(72) Inventor: Huping Jia, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 147 days.

(21) Appl. No.: 13/983,702

(22) PCT Filed: Jun. 29, 2013

(86) PCT No.: PCT/CN2013/078515
§ 371 (c)(1),
(2) Date: Aug. 5, 2013

(87) PCT Pub. No.: WO2014/180063
PCT Pub. Date: Nov. 13, 2014

(65) Prior Publication Data
US 2017/0183168 A1    Jun. 29, 2017

(30) Foreign Application Priority Data

May 10, 2013  (CN) .......................... 2013 1 0173565

(51) Int. Cl.
*G06F 7/00* (2006.01)
*B65G 49/06* (2006.01)
(Continued)

(52) U.S. Cl.
CPC ............. *B65G 49/06* (2013.01); *B65G 15/30* (2013.01); *B65G 43/00* (2013.01); *G05B 11/32* (2013.01);
(Continued)

(58) Field of Classification Search
None
See application file for complete search history.

(56) References Cited

U.S. PATENT DOCUMENTS

2003/0083803 A1* 5/2003 Serkh ...................... F02B 67/06
701/115

FOREIGN PATENT DOCUMENTS

CN        1183522 A      6/1998
CN        2568653 Y      8/2003
(Continued)

OTHER PUBLICATIONS

Cheng Cheng, the International Searching Authority written comments, Jan. 2014, CN.

*Primary Examiner* — Yolanda Cumbess

(57) ABSTRACT

A system for providing automatic feedback and adjusting transmittal pulling force for transporting glass fragment, where the system comprises a delivery machine, a glass broken machine and a recycle box. The glass fragment is transmitted by the delivery machine and triturated by the glass broken machine, and the triturated glass fragment is then transported to the recycle box, the delivery machine comprises a driving motor, a conveyer belt and two driving rollers, where the conveyer belt surrounds the two driving rollers, the driving rollers are driven by the driving motor to rotate the conveyer belt, and the glass fragment on the conveyer belt is transported into the glass broken machine for triturating and recycling.

9 Claims, 1 Drawing Sheet

(51) Int. Cl.
*B65G 15/30* (2006.01)
*G05B 11/32* (2006.01)
*B65G 43/00* (2006.01)

(52) U.S. Cl.
CPC .... *B65G 2811/095* (2013.01); *B65G 2813/00* (2013.01)

(56) References Cited

FOREIGN PATENT DOCUMENTS

| | | | |
|---|---|---|---|
| CN | 1597470 | A | 3/2005 |
| CN | 2841589 | Y | 11/2006 |
| CN | 101434343 | A | 5/2009 |
| CN | 101772619 | A | 7/2010 |
| CN | 101786033 | A | 7/2010 |
| CN | 101948045 | A | 1/2011 |
| CN | 102632072 | A | 8/2012 |
| GB | 548816 | A | 10/1942 |

* cited by examiner

SYSTEM FOR PROVIDING AUTOMATIC FEEDBACK AND ADJUSTING TRANSMITTAL PULLING FORCE FOR TRANSPORTING GLASS FRAGMENT

FIELD OF THE INVENTION

The present invention relates to a driving system, and more particularly to a system for providing automatic feedback and adjusting transmittal pulling force for transporting glass fragment by automatically controlling and adjusting transmittal pulling force of the conveyer belt using a positive and negative current feedback circuit.

BACKGROUND OF THE INVENTION

In the current system of the glass fragment transmitting, the driving roller is usually rolls some glass fragments. With long time friction of the glass fragment on the driving roller, the conveyer belt will cause to be loose and then the pulling force be reduced, so that the glass fragment cannot be transported to the glass broken machine. As a result, there are a lot of glass fragments resisted on the conveyer belt. It should spend many time and energy to clean the conveyer belt and the driving roller. The cleaning process causes the manufacture efficiency decline and the working life of the transmitting system to decrease.

Therefore, it is necessary to provide a system for providing automatic feedback and adjusting transmittal pulling force for transporting glass fragment, so as to ensure the normal transporting of the glass fragment and improve the manufacture efficiency.

SUMMARY OF THE INVENTION

In view of disadvantages of the prior art, the major purpose of the invention is to provide a system for providing automatic feedback and adjusting transmittal pulling force for transporting conveyer belt to keep the glass fragment transport smoothly.

The present invention is provided a system for automatic feedback and adjust transmittal pulling force of the glass fragment, which comprising a delivery machine, a glass broken machine and a recycle box, the glass fragments are transported by the delivery machine and triturated by the glass broken machine, and then transmitted them to the recycle box. The delivery machine comprising a driving motor, a conveyer belt and a driving roller, the conveyer belt is surrounded between the two driving rollers, the driving roller is turn round by the driving of the driving motor to lead the conveyer belt rotating at the same time, and then the glass fragments on the conveyer belt could be transported into the glass broken machine for triturating and recycling, wherein, an electromagnetic control system is provided for automatic adjusting the transmittal pulling force of the conveyer belt depend on the distance between the two driving rollers, which is connecting with the driving roller.

Perfectly, the electromagnetic control system comprises a battery, two magnetic coils, an ampere meter and a current negative feedback circuit, wherein, two electromagnets of the magnetic coils are located face toward to bring the opposite electromagnetic repulsive force on electricity. The current could be adjusted with the current negative feedback circuit. The ampere meter is provided for measuring the present current of the magnetic coils and adjusting the variety of the current by feeding back the current value to the current negative feedback circuit, which is electric connecting between the magnetic coils and the current negative feedback circuit.

Perfectly, the current negative feedback circuit is in series with a variable resistance and the ampere meter, the current negative feedback circuit could adjust the resistance and the current value depending on the present current value.

Perfectly, the current negative feedback circuit can control the current of the magnetic coils to keep the transmittal pulling force of the conveyer belt constantly.

The transmittal pulling force will be decreasing with the current reducing, then the current negative feedback circuit can reduce the variable resistance value to raise the current and the repelling force between the two electromagnets, and then the distance between the driving rollers will be decreasing to cause the transmittal pulling force of the conveyer belt increase.

The transmittal pulling force will be decreasing with the current raising, then the current negative feedback circuit can increase the variable resistance value to reduce the current and the repelling force between the two electromagnets, and then the distance between the driving rollers will be shortened to cause the transmittal pulling force of the conveyer belt reduce.

Perfectly, the magnetic coils comprising a fixed coil and a movable coil, a fixed electromagnet is located in the fixed coil and a movable electromagnet is also located in the movable coil, the magnetic poles of the fixed electromagnet and the movable electromagnet are face toward. The driving roller comprises a fixed driving roller and a mobile driving roller. The distance between the two driving rollers can be adjusted with the horizontal moving of the mobile driving roller. The mobile driving roller is connecting to the movable electromagnet with a steadying bar, the mobile driving rollers can adjust the distance between the two driving rollers with the pulling of the opposite electromagnetic repulsive force.

Compared to the prior art, the system using the positive and negative current feedback circuit to automatically control and adjust the transmittal pulling force of the conveyer belt has the following advantages:

(1) If setting one of two driving rollers as a fixed driving roller, and the other of the two driving rollers as a mobile driving roller, the distance between the two driving rollers can be adjusted according to the parallel shifting of the mobile driving roller to adjust the transmittal pulling force of the conveyer belt to avoid the conveyer belt too loose or too tighter, so as to ensure the glass fragments can be transported keep smoothly.

(2) An electromagnetic control system connected to the two driving rollers adjusts the distance between the two driving rollers. An outputting current can be adjusted according to change of the magnetic force between two electromagnets. When the magnetic force is reduced, the resistance value will be reduced and the outputting current is increased. When the magnetic force is increased, the resistance value is decreased and the current is reduced. Under the feeding back control of the positive and negative current feedback circuit, the magnetic force can be adjusted in real time to adjust the distance between the two driving rollers, so as to ensure the pulling force of the conveyer belt remain steady.

DESCRIPTIONS OF THE DRAWINGS

DETAILED DESCRIPTION OF THE PREFERRED EMBODIMENTS

Figure 1:
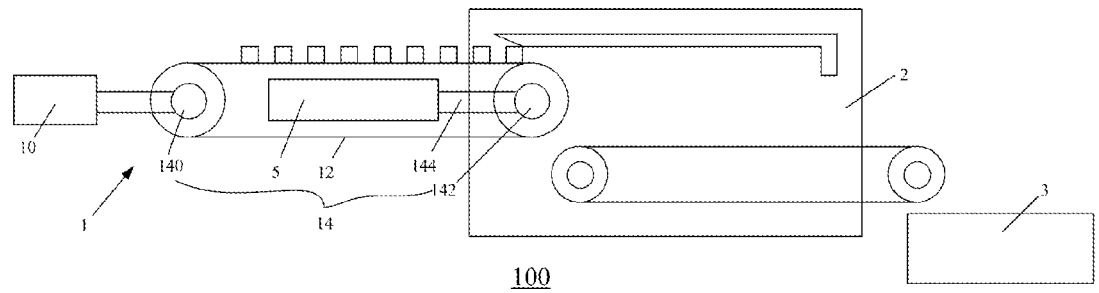
FIG. 1 is a schematic view showing of the system for providing automatic feedback and adjusting transmittal pulling force for transporting glass fragment of the present disclosure.

Refer to FIG. 1, the present disclosure provides a system for providing automatic feedback and adjusting transmittal pulling force for transporting glass fragment 100, where the system comprises a delivery machine 1, a glass broken machine 2 and a recycle box 3, the glass fragments are transmitted by the delivery machine 1 and triturated by the glass broken machine 2, and the triturated glass fragment is then transported to the recycle box 3. The delivery machine 1 comprises a driving motor 10, a conveyer belt 12 and two driving rollers 14. The conveyer belt 10 is connected to the two driving rollers 14 to rotate the two driving rollers 14. The conveyer belt 12 surrounds the two driving rollers 14. The driving rollers 14 are driven by the driving motor 10 to rotate the conveyer belt 12, and the glass fragments on the conveyer belt 12 is transported into the glass broken machine 2 for triturating, at last, the triturated glass fragments can be transported into the recycle box 3 for recycling by a belt.

Figure 2:
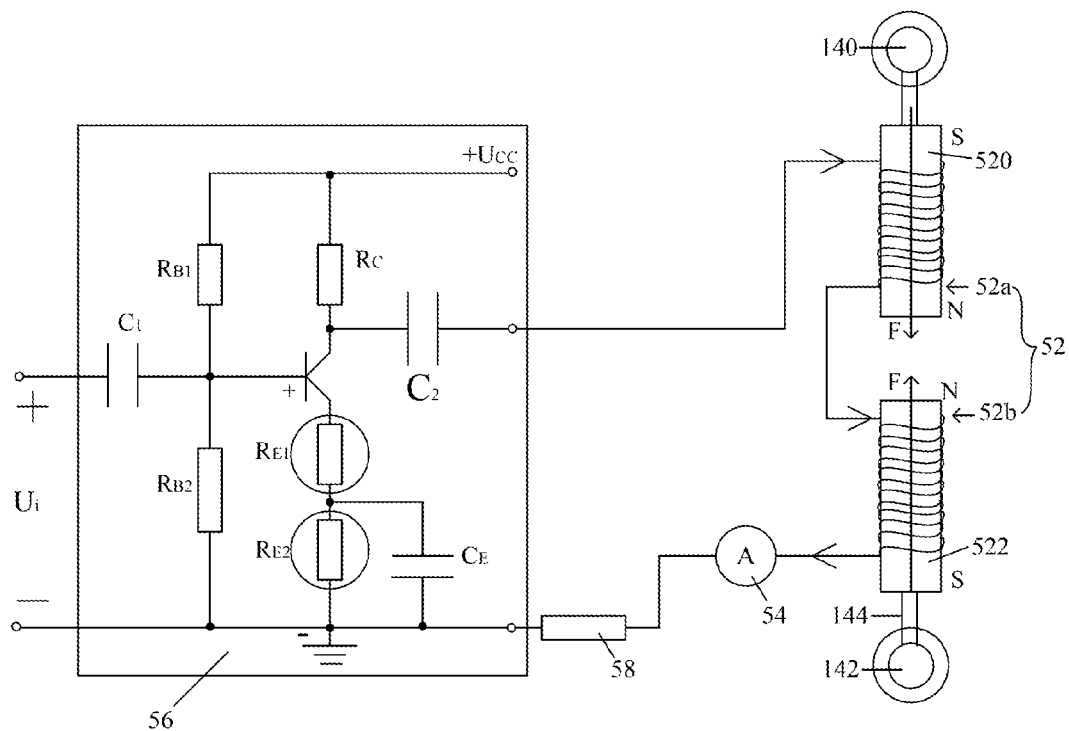
FIG. 2 is a schematic view showing of the electromagnetic control system in the system for providing automatic feedback and adjusting transmittal pulling force for transporting the glass fragment of the present disclosure.

In the preferably embodiment of the present disclosure, refer to FIG. 2, the system 100 further comprises an electromagnetic control system 5 connected to the two driving rollers 14. The electromagnetic control system 5 automatically adjusts the transmittal pulling force of the conveyer belt 12 according to the distance between the two driving rollers 14. Wherein, the electromagnetic control system 5 successively comprises a battery 50, two magnetic coils 52, an ampere meter 54 and a positive and negative current feedback circuit 56. The battery 50 is electrically connected to the positive and negative current feedback circuit 56 to provide power for the positive and negative current feedback circuit 56. The magnetic coils 52 are in series with each other. The ampere meter 54 is electrically connected between an output end of the magnetic coils 52 and the the positive and negative current feedback circuit 56 for recording the instantaneous current value from the magnetic coils 52, and then the instantaneous current is outputted to the positive and negative current feedback circuit 56 for feeding back to the input current of the magnetic coils 52.

In the present embodiment of the disclosure, the magnetic coils 52 comprise a fixed coil 52a and a movable coil 52b. The power wire is leaded into from the fixed coil 52a and leaded out from the one end of the movable coil 52b by surrounding the fixed coil 52 and the movable coil 52b. A fixed electromagnet 520 is located in the fixed coil 52a and a movable electromagnet 522 is also located in the movable coil 52b. According to the principle of electromagnet attraction, the coiling way of the source coil and the current direction has many ways. The magnetic pole of the fixed electromagnet 520 is face toward to magnetic pole of the movable electromagnet 522. In the present embodiment, the N pole of the fixed electromagnet 520 is face toward N pole of the movable electromagnet 522, so a repulsive current is produced. The two electromagnets of the magnetic coils are located face toward to bring the opposite electromagnetic repulsive force on electricity, the distance between the two driving rollers 14 can be adjusted according to change of the opposite electromagnetic repulsive force.

According to $F=K (i^2/d^2)$, the formula shows that the magnetic force "F" between the two electromagnets is in proportion to the square of the current "i" and is inversely proportional to the distance "d" between the two electromagnets. That is to say, the magnetic force "F" is increased as the current is increased and is decreased as the distance between the two electromagnets is increased. Therefore, controlling the change of the magnetic force "F" depends on controlling the variety of the current. The current can be controlled and adjusted by the positive and negative current feedback circuit to keep the transmittal pulling force constant.

The two driving rollers 14 comprise a fixed driving roller 140 and a mobile driving roller 142, the distance between the two driving rollers 14 is adjusted by the horizontal moving of the mobile driving roller 142, so as to adjust the transmittal pulling force of the conveyer belt 12.

The mobile driving roller 142 is connected to the movable electromagnet 522 with a steadying bar 144, the distance between the two driving rollers 14 is adjusted by pulling using the opposite electromagnetic repulsive force.

The ampere meter 54 is arranged between the magnetic coils 52 and the positive and negative current feedback circuit 56, to measure the electric current output by the magnetic coils 52 and feedback the electric current to the positive and negative current feedback circuit 56, further adjusting the electric current.

For adjusting the current in real time, a variable resistor 58 is electrically connected to the magnetic coil 52 and the positive and negative current feedback circuit 56. The current is adjusted according to the change of the resistance value of the variable resistor 58.

The controlling process of the positive and negative current feedback circuit is following:

If the conveyer belt 12 and the driving roller 14 occurs loose, the transmittal pulling force of the conveyer belt 12 is decreased. At the same time, the movable electromagnet 522 can move toward the movable coil 52b based on the opposite electromagnetic repulsive force, so that the distance between the magnetic coils 52 is increased and the transmittal pulling force of the conveyer belt 12 is increased. And then the conveyer belt 12 is more tightened between the two driving rollers 14 to transmit the glass fragment using a normal transmittal pulling force.

When the distance between the magnetic coils is increased, the magnetic force and the current are decreased, and the transmittal pulling force of the conveyer belt is decreased. At that time, the positive and negative current feedback circuit 56 can reduce the resistance value of the variable resistor to increase the current and the repelling force between the two electromagnets, the force resist on the conveyer belt 12 and the driving roller 14 should be increased continually, which is from the electromagnets. And then the distance between the driving rollers 14 are increased to increase the transmittal pulling force of the conveyer belt 12, so as to adjust the transmittal pulling force. The glass fragments can be normally transported on the tighten conveyer belt 12.

On the contrary, If the transmittal pulling force of the conveyer belt 12 is too larger, the conveyer belt 12 applies an inward force on the driving roller 14 to push the electromagnets moving toward inside, and then the distance between the fixed electromagnet 520 and the movable electromagnet 522 is reduced and the magnetic force is increased. The transmittal pulling force of the conveyer belt 12 is decreased when the current is increased, then the positive and negative current feedback circuit 56 can increase the resistance value of the variable resistor to reduce the current and the repelling force between the two electromagnets, and then the distance between the driving rollers 14 is shortened to reduce the transmittal pulling force of the conveyer belt 12 and keep the current and the magnetic force steady. As a result, the glass fragments can be transported on the tighten conveyer belt 12.

The system for providing automatic feedback and adjusting transmittal pulling force for transporting glass fragment can automatic adjust balance between the intensity of the current and the distance of the electromagnets, for achieving a stable state of the transmittal pulling force without manual operation. As a result, if the conveyer belt is too loose, the glass fragment will be resisted on the conveyer belt. If the conveyer belt is too tightening, then elasticity of the conveyer belt will be reduced. Now the problems could be solved that the glass fragment would not be transported to the glass broken machine on a loose or tighten conveyer belt, so the manufacture efficiency is improved.

What is claimed is:

1. A system for providing automatic feedback and adjusting transmittal pulling force for transporting glass fragment, the system comprises a delivery machine, a glass broken machine and a recycle box, wherein the glass fragment is transmitted by the delivery machine and triturated by the glass broken machine, and the triturated glass fragment is then transported to the recycle box, the delivery machine comprising a driving motor, a conveyer belt and two driving rollers, wherein the conveyer belt surrounds the two driving rollers, the driving rollers are driven by the driving motor to rotate the conveyer belt, and the glass fragment on the conveyer belt is transported into the glass broken machine for triturating and recycling, wherein, the system further comprises an electromagnetic control system connected to the two driving rollers to automatically adjust the transmittal pulling force according to distance between the two driving rollers, the electromagnetic control system comprises a battery, two magnetic coils, an ampere meter and a positive and negative current feedback circuit, the two magnetic coils comprises two electromagnets that are located facing towards each other to bring the opposite electromagnetic repulsive force on an electric current, the electric current is adjusted the positive and negative current feedback circuit.

2. The system for providing automatic feedback and adjusting transmittal pulling force for transporting glass fragment according to claim 1, wherein the positive and negative current feedback circuit is in series with a variable resistor and the ampere meter, the positive and negative current feedback circuit changes resistance value of the variable resistor to adjust the electric current depending on value of the electric current feedbacked by the ampere meter.

3. The system for providing automatic feedback and adjusting transmittal pulling force for transporting glass fragment according to claim 2, wherein the positive and negative current feedback circuit controls the electric current of the magnetic coils for controlling negative feedback to keep the transmittal pulling force of the conveyer belt constant.

4. The system for providing automatic feedback and adjusting transmittal pulling force for transporting glass fragment according to claim 2, wherein the ampere meter is arranged between the magnetic coils and the positive and negative current feedback circuit, to measure the electric current output by the magnetic coils and feedback the electric current to the positive and negative current feedback circuit, further adjusting the electric current.

5. The system for providing automatic feedback and adjusting transmittal pulling force for transporting glass fragment according to claim 3, wherein the transmittal pulling force is decreased when the electric current measured by the ampere meter is decreased, then the positive and negative current feedback circuit reduces resistance value of the variable resistor to increase the electric current the repelling force between the two electromagnets, and then the distance between the two driving rollers increases to increase the transmittal pulling force of the conveyer belt.

6. The system for providing automatic feedback and adjusting transmittal pulling force for transporting glass fragment according to claim 3, wherein the transmittal pulling force increases when the electric current measured by the ampere meter increases, then the positive and negative current feedback circuit increases resistance value of the variable resistor to reduce the electric current and the repelling force between the two electromagnets, and then the distance between the two driving rollers is shortened to reduce the transmittal pulling force of the conveyer belt.

7. The system for providing automatic feedback and adjusting transmittal pulling force for transporting glass fragment according to claim 3, wherein the magnetic coils comprising a fixed coil and a movable coil, a fixed electromagnet is located in the fixed coil and a movable electromagnet is located in the movable coil, the magnetic poles of the fixed electromagnet and the movable electromagnet are faced towards each other.

8. The system for providing automatic feedback and adjusting transmittal pulling force for transporting glass fragment according to claim 1, wherein the two driving rollers comprise a fixed driving roller and a mobile driving roller, the distance between the two driving rollers is adjusted with the horizontal moving of the mobile driving roller.

9. The system for providing automatic feedback and adjusting transmittal pulling force for transporting glass fragment according to claim 8, wherein the mobile driving roller is connected to the movable electromagnet by a steadying bar, the distance between the two driving rollers is adjusted by pulling using the opposite electromagnetic repulsive force.

* * * * *